J. SMALLEY.
Anti-Friction Composition for Bearings.
No. 227,849.  Patented May 18, 1880.
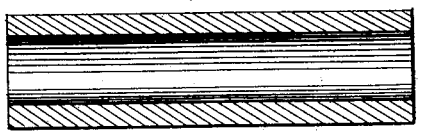
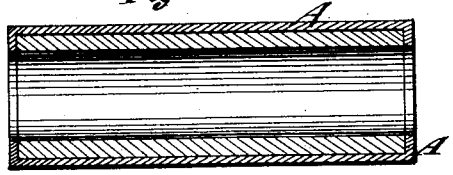
Witnesses  Inventor.

UNITED STATES PATENT OFFICE.

JOHN SMALLEY, OF BOUNDBROOK, NEW JERSEY.

ANTI-FRICTION COMPOSITION FOR BEARINGS.

SPECIFICATION forming part of Letters Patent No. 227,849, dated May 18, 1880.

Application filed July 8, 1879.

*To all whom it may concern:*

Be it known that I, JOHN SMALLEY, of Boundbrook, in the county of Somerset and State of New Jersey, have invented a certain new and Improved Composition for Bearings, &c., of which the following is a specification.

In various kinds of machinery, what are known as "anti-friction" compositions have been used to line the surfaces of bearings of various kinds. The object of all such compositions has been to reduce the friction generated in such bearings and hence to effect economy of power and oil or other lubricating material in the use of such machinery.

My invention consists in a composition composed of plumbago or graphite and shellac, which has superior anti-friction qualities for lining the bearings of machinery of various kinds.

In the accompanying drawings, Figure 1 represents a longitudinal section of a bush for lining a bearing, made of my composition, and Fig. 2 represents a similar view of a bush made of metal and lined with my composition.

In preparing my composition, I generally take about seventy-five per cent., (75%,) by weight, of plumbago or graphite and about twenty-five per cent., (25%,) by weight, of shellac.

I preferably first dissolve the shellac in a sufficient quantity of alcohol—say about two (2) pounds of shellac to about three (3) pints of alcohol—and after reducing the plumbago or graphite to a fine powder it is introduced and stirred into the shellac solution to form a composition of dough-like consistency. After thoroughly commingling the plumbago and shellac the composition may be spread on a board or other surface, and dried by exposure to the atmosphere or in an oven, and is afterward preferably ground to a fine powder in any suitable mill.

To form the composition into the desired articles it may be taken either in lumps or masses of suitable size, or, preferably, pulverized, as above described, and placed in a mold of the proper size and shape, heated by steam or otherwise to a temperature of, say, 200° to 600° Fahrenheit, and when thus heated the composition may be pressed into the desired shape. The high degree of heat softens the shellac, and its adhesive qualities bind the particles of graphite together and form a hard and tough composition. When designed for the lining of a box, bolster, or other article, it may be molded and pressed into place, as in Fig. 2, the bolster A forming a mold.

Instead of dissolving the shellac in alcohol, it may be fused by a heat of about 250° Fahrenheit, and plumbago or graphite introduced and thoroughly commingled therewith by stirring or otherwise. In such case, however, it is not practicable to use so large a proportion of plumbago as when the shellac is first dissolved in alcohol. When so prepared the mixture is preferably dried and ground to powder, as previously described; but it may be introduced into the heated molds in lumps or masses of suitable size, and the grinding dispensed with.

Bushings or linings of this composition may be used for loose pulleys, bearings, axle-boxes, spindle-bolsters, steps, &c., and their use serves to greatly lessen the amount of friction generated by such bearings, and also to lessen the amount of oil or other lubricating material used, and in some cases to altogether dispense with the same. The composition may also be molded into sheets and used for flat bearings, such as the gibs and guides of steam-engines and other machinery.

Although this composition is preferably molded while hot and plastic, it might be worked into the desired shape from solid masses when cold.

I have herein specified those proportions of shellac and graphite or plumbago which experiments have shown to give the best results; but the proportions may be varied without materially changing the character of my composition.

Heretofore anti-friction compounds for bearings of that class to which my invention more closely appertains have been composed of a compound of graphite and gum-copal, or of graphite, gum-copal, and sulphur or sugar, as in the English Patent No. 3,148 of 1875, and they have also been made of rubber, sulphur, and plumbago or graphite, as in the patent of Mayall, dated June 24, 1873, No. 140,208; but so far as I am aware there has never been an anti-friction compound for the surfaces of bearings made of plumbago or graphite and shellac.

By the use of shellac in connection with plumbago or graphite I have found by actual experiments that the shellac imparts an important quality to the compound—viz., it renders the composition more durable and capable of resisting greater pressure without liability of disintegrating; and, further, the compound is rendered more plastic when hot than where made with gum-copal, and is harder when cold.

What I claim as my invention, and desire to secure by Letters Patent, is—

The anti-friction composition composed of plumbago or graphite and shellac, substantially as herein specified.

JOHN SMALLEY.

Witnesses:
FREDK. HAYNES,
E. P. JESSUP.